US 7,099,463 B1

(12) United States Patent
Karam

(10) Patent No.: US 7,099,463 B1
(45) Date of Patent: *Aug. 29, 2006

(54) METHOD AND APPARATUS FOR DETECTING A COMPATIBLE PHANTOM POWERED DEVICE USING COMMON MODE SIGNALING

(75) Inventor: Roger A. Karam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/855,212

(22) Filed: May 26, 2004

Related U.S. Application Data

(63) Continuation of application No. 09/710,388, filed on Nov. 9, 2000, now Pat. No. 6,804,351.

(51) Int. Cl.
*H04M 1/00* (2006.01)
*H04M 9/00* (2006.01)

(52) U.S. Cl. .......................... 379/413.03; 379/387.01; 379/388.06; 379/395.01; 379/399.01

(58) Field of Classification Search ........... 379/387.01, 379/388.06, 395.01, 399.01, 423, 413.03, 379/413.01, 413.02
See application file for complete search history.

(56) References Cited

U.S. PATENT DOCUMENTS

| | | | |
|---|---|---|---|
| 4,131,767 A | 12/1978 | Weinstein | |
| 4,161,719 A | 7/1979 | Parikh et al. | |
| 4,232,199 A | 11/1980 | Boatwright et al. | |
| 4,397,020 A | 8/1983 | Howson | |
| 4,532,626 A | 7/1985 | Flores et al. | |
| 4,599,494 A | 7/1986 | Welty | |
| 4,626,954 A | 12/1986 | Damiano et al. | |
| 4,710,949 A | 12/1987 | Ahuja | |
| 4,723,267 A | 2/1988 | Joens et al. | |
| 4,875,223 A | 10/1989 | Curtis | |
| 4,969,179 A | 11/1990 | Kanare et al. | |
| 5,029,201 A | 7/1991 | Bindels | |
| 5,034,948 A | 7/1991 | Mizutani et al. | |
| 5,056,131 A | 10/1991 | Kanare et al. | |
| 5,089,927 A | 2/1992 | Bulan et al. | |

(Continued)

FOREIGN PATENT DOCUMENTS

WO 99/53408 10/1999

OTHER PUBLICATIONS

Daniel Dove, Powerpoint Presentation: "Power over the DTE" Jan. 2000.

(Continued)

*Primary Examiner*—Matthew Anderson
*Assistant Examiner*—Tuan Pham
(74) *Attorney, Agent, or Firm*—Thelen Reid & Priest LLP; David B. Ritchie

(57) ABSTRACT

A method and an apparatus provide for determining whether a data terminal equipment (DTE) device represents a compatible device lacking an independent power supply and adapted to be powered using phantom power over a wired connection from a communications device such as a switch. A detection signal may be transmitted from the communications device to an identity network connected to the DTE. A response detection signal may be returned and checked in a receiver at the communications device. A switch may then be closed to provide phantom power if the result of the check indicates that the DTE is a compatible device adapted to receive phantom power. Compatible DTE device may include telephones, Voice over IP (VoIP, IP or Ethernet) telephones, network access devices, computers, and the like.

29 Claims, 7 Drawing Sheets

U.S. PATENT DOCUMENTS

| | | |
|---|---|---|
| RE33,900 E | 4/1992 | Howson |
| 5,148,144 A | 9/1992 | Sutterlin et al. |
| 5,199,049 A | 3/1993 | Wilson |
| 5,223,806 A | 6/1993 | Curtis et al. |
| 5,311,518 A | 5/1994 | Takato et al. |
| 5,321,372 A | 6/1994 | Smith |
| 5,406,260 A | 4/1995 | Cummings et al. |
| 5,541,957 A | 7/1996 | Lau |
| 5,574,748 A | 11/1996 | Vander Mey et al. |
| 5,655,077 A | 8/1997 | Jones et al. |
| 5,659,542 A | 8/1997 | Bell et al. |
| 5,671,354 A | 9/1997 | Ito et al. |
| 5,684,950 A | 11/1997 | Dare et al. |
| 5,796,185 A | 8/1998 | Takata et al. |
| 5,799,040 A | 8/1998 | Lau |
| 5,802,042 A | 9/1998 | Natarajan et al. |
| 5,815,665 A | 9/1998 | Teper et al. |
| 5,918,016 A | 6/1999 | Brewer et al. |
| 5,944,824 A | 8/1999 | He |
| 5,991,885 A * | 11/1999 | Chang et al. ............... 713/300 |
| 6,011,910 A | 1/2000 | Chau et al. |
| 6,021,496 A | 2/2000 | Dutcher et al. |
| 6,026,146 A * | 2/2000 | Nowka et al. ........... 379/29.01 |
| 6,047,376 A | 4/2000 | Hosoe |
| 6,092,196 A | 7/2000 | Reiche |
| 6,115,468 A | 9/2000 | De Nicolo |
| 6,140,911 A | 10/2000 | Fisher et al. |
| 6,218,930 B1 * | 4/2001 | Katzenberg et al. ........ 370/200 |
| 6,246,748 B1 | 6/2001 | Yano |
| 6,366,143 B1 | 4/2002 | Liu et al. |
| 6,535,983 B1 | 3/2003 | McCormack et al. |
| 6,541,878 B1 | 4/2003 | Diab |
| 6,611,537 B1 * | 8/2003 | Edens et al. ................ 370/503 |
| 6,640,308 B1 * | 10/2003 | Keyghobad et al. ........ 713/300 |
| 6,931,121 B1 * | 8/2005 | Tiso et al. ............. 379/399.01 |

OTHER PUBLICATIONS

Robert Muir, Powerpoint Presentation: "Update on Diode Discovery Process" May 2, 2000.

* cited by examiner

//METHOD AND APPARATUS FOR
DETECTING A COMPATIBLE PHANTOM
POWERED DEVICE USING COMMON
MODE SIGNALING

CROSS-REFERENCE TO RELATED
APPLICATIONS

This application is a continuation application based on U.S. patent application Ser. No. 09/710,388, filed on Nov. 9, 2000 now U.S. Pat. No. 6,804,351.

FIELD OF THE INVENTION

The present invention relates generally to a method and apparatus for detecting the presence of a connected device of a particular class, such as a telephone, that may require phantom power to be supplied over twisted pair wiring. More specifically, the present invention relates to a communication device that detects a need for phantom power and supplies that power.

BACKGROUND OF THE INVENTION

Telephones and other types of data terminal equipment (DTE) are routinely used for voice data and other forms of telecommunication. Examples of these include voice communication devices or telephones operating through a private branch exchange (PBX) or key telephone system. PBX-type and key telephone system-type telephones typically require the application of external electrical power in order to operate. The power is used to energize circuits within the telephone circuitry, such as processing displays and the like.

There are essentially two practical methods available for powering such telephones. The first method provides power directly to the telephone. This may be accomplished by a wall-mounted transformer providing a direct current (DC) or alternating current (AC) low voltage power supply to the telephone from the electric power grid. Such direct power methods have a number of drawbacks. Apart from continuous occupation of a potentially scarce electrical outlet, during a power grid disruption, the power to the telephone may be disconnected rendering the telephone inoperative and effectively precluding emergency telephone usage during the black out.

The second method for providing telephone power involves supplying so-called "phantom power" by coupling a power signal (typically up to about 48 volts DC) to the telephone over twisted pair lines as taught, for example, in U.S. Pat. No. 6,115,468 entitled "Power Feed for Ethernet Telephones via Ethernet Link". In accordance with a specific embodiment of the aforementioned patent, as illustrated in FIG. 1 hereof, a system 10 including a plurality of data ports 12, 14, and 16 within a communication device such as a switch 18 is provided to transmit data on lines 20 and 22, 24 and 26, and 28 and 30 to and from first, second, and third load devices 32, 34, and 36, respectively. Load devices 32, 34, and 36 may be associated with Ethernet telephones and/or other Ethernet devices 38, 40, and 42 respectively, requiring power to be transmitted to them in addition to data over Ethernet twisted pair lines.

Turning to the first port 12 in FIG. 1 as an example, data on lines 22 and 20 are provided to transmitter 44 and from receiver 46, respectively. Transmitter 44 drives data traffic along pair 48, while receiver 46 receives data from pair 50.

First transformer 52 includes a first primary 54 connected to pair 48, and a second primary 56 connected to pair 50.

A similar arrangement exists at first load 32. Second transformer 58 includes a first secondary 60 and a second secondary 62. These are respectively connected to pairs 64 and 66 that are, respectively, connected through receiver 68 and transmitter 70 to load device 32. Ethernet link 72 couples first and second secondaries 74 and 76 of first transformer 52 to first and second primaries 78 and 80 of second transformer 58. Ethernet link 72 preferably comprises a pair of twisted pair conductors 82a and 82b, wherein twisted pair 82a connects first secondary 74 to first primary 78 and twisted pair 82b connects second secondary 76 to second primary 80.

Power coupling may be provided as follows: Secondaries 74 and 76 of first transformer 52 each include a center tap 84 and 86 respectively. Center tap 84 connects to the positive lead 88 of a power supply 90, and center tap 86 connects to the negative lead 92 of power supply 90, which may, preferably, include an uninterruptible power supply (UPS). DC filtering components 94a, 94b, and 94c may be provided as well known to those of ordinary skill in the art. Now the entire loop of twisted pair 82a is at the potential of positive lead 88 while the entire loop of twisted pair 82b is at the potential of negative lead 92 without any impact on data transmission. A power processor 96 may preferably be attached to center taps 98 and 100 of first and second primaries 80 and 82 of second transformer 58, respectively, so as to provide a DC power source to the power processor 96.

The power processor 96, shown in more detail in FIG. 2, conventionally includes a filter 102, a rectifier 104, a filter capacitor 106, and a DC—DC converter 108. Other similar arrangements are also well known to those of ordinary skill in the art. The power processor 96 may perform DC—DC power conversion and filtering required, as well as provide power over leads 110 and 112 to load 32, which may be an Ethernet telephone or other device.

Returning to FIG. 1, the communication system 10 may be divided into a switch 18 and DTE devices 38, 40 and 42. The switch 18 may be found within a telephone equipment room, for example. Cables may then be routed from the load devices 32, 34, and 36 to the switch 18 for connecting to conventional jacks or connectors of the switch (not shown) such as the well-known type RJ-45 connectors (as used herein the term RJ-45 type connector is intended to include both male (plugs) and female (sockets) variants thereof). Because the switch 18 supplies a DC bias to the center taps 84 and 86, and because the switch 18 may conceivably be used with legacy DTE potentially not compatible with the application of such a voltage, it would be desirable to provide a mechanism for detecting which ports of such a switch 18, should and should not have phantom power applied. Phantom power should then be supplied to a DTE if the switch establishes that the DTE is a compatible IP telephone or other compatible powerable network device. However, a priori determination of this condition is not presently available, and thus a requirement for power at the DTE cannot presently be determined. Accordingly, there exists a need for an efficient, simple, and inexpensive method and apparatus for detection of a compatible IP device that should be provided with phantom power.

BRIEF SUMMARY OF THE INVENTION

A method and an apparatus provide for determining whether a data terminal equipment (DTE) device represents a compatible device lacking an independent power supply and adapted to be powered using phantom power over a wired connection from a communications device such as a switch. A detection signal may be transmitted from the communications device to an identity network connected to the DTE. A response detection signal may be returned and checked in a receiver at the communications device. A switch may then be closed to provide phantom power if the result of the check indicates that the DTE is a compatible device adapted to receive phantom power. Compatible DTE devices may include telephones, Voice over IP (VoIP, or IP or Ethernet) telephones, network access devices, computers and the like.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Various exemplary embodiments of the present invention are described herein in the context of a method and apparatus for detecting a compatible phantom powered device using common mode signaling. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks (LANs), wide area networks (WANs), the Internet, cable television systems, telephone systems, wireless telecommunications systems, fiber optic networks, ATM networks, frame relay networks, satellite communications systems, and the like. Such networks are well known in the art and consequently are not further described herein.

Figure 1:
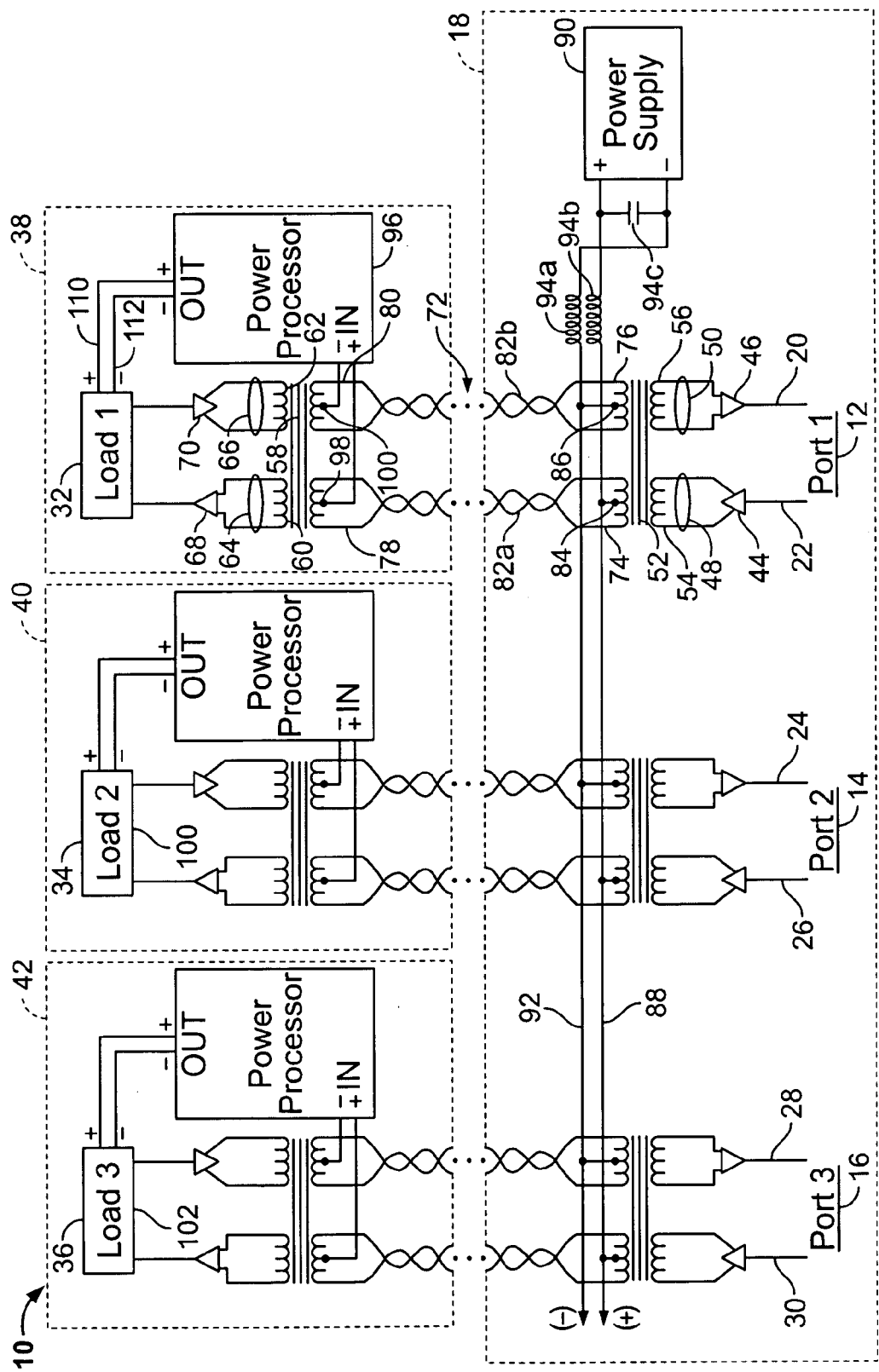
FIG. 1 is an electrical schematic diagram of a phantom power distribution system for an Ethernet telephones in accordance with the prior art.
Figure 2:
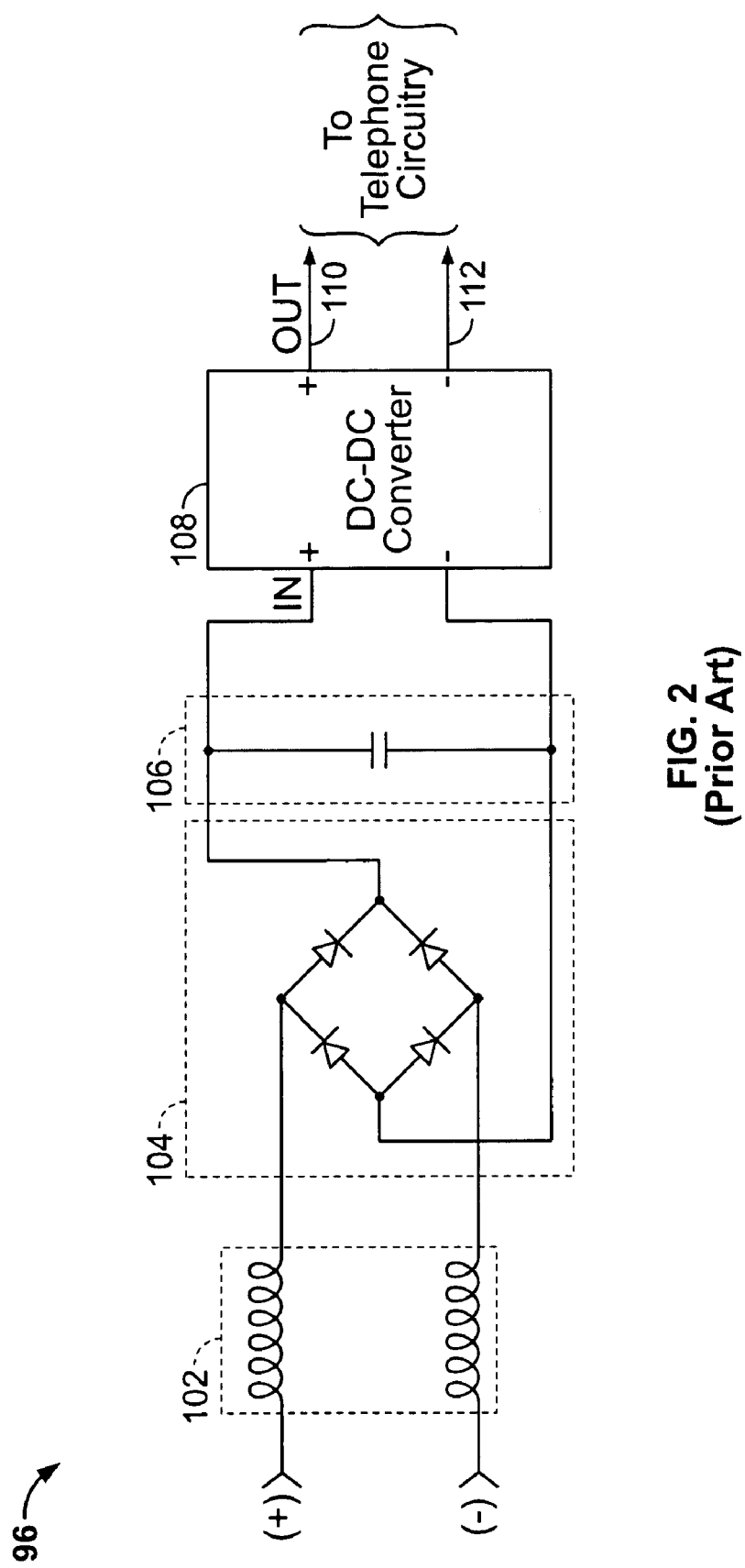
FIG. 2 is an electrical schematic diagram of a prior art telephone phantom power extraction system in accordance with the prior art.

The present invention relates to a method and apparatus to determine whether a DTE device requires phantom electrical power to be supplied via center taps in magnetic transformers as illustrated in FIG. 1. The apparatus transmits a detection signal to ascertain the presence of a DTE device requiring phantom power and analyzes the response signal to make the determination. The apparatus includes switches or similar devices to both connect direct current for remote phantom power transmission and to disable detection signal interference during data exchange. The method includes a sequence of operations with a logic gate to open or close the switches in accordance with the received response signal. The switches may be electromechanical, or more preferably, electronic, for example, transistors and MOSFETs.

Electric current is carried across a transformer from primary to secondary windings by differential mode (opposite polarity signaling). In common mode (same polarity signaling), an AC signal connected to a transmit transformer center tap may be propagated to a receive transformer center tap without echoing a ghost signal across either transformer. This ghost signal blockage results from the common mode destructive interference (signal amplitudes at 180° phase difference) in the transformer core, and by using a well-controlled signal having a limited bandwidth. Similarly, a DC signal will normally be blocked in common mode signaling from the primary to the secondary, but may be applied to the center tap and propagated as illustrated in FIG. 1.

Figure 3:
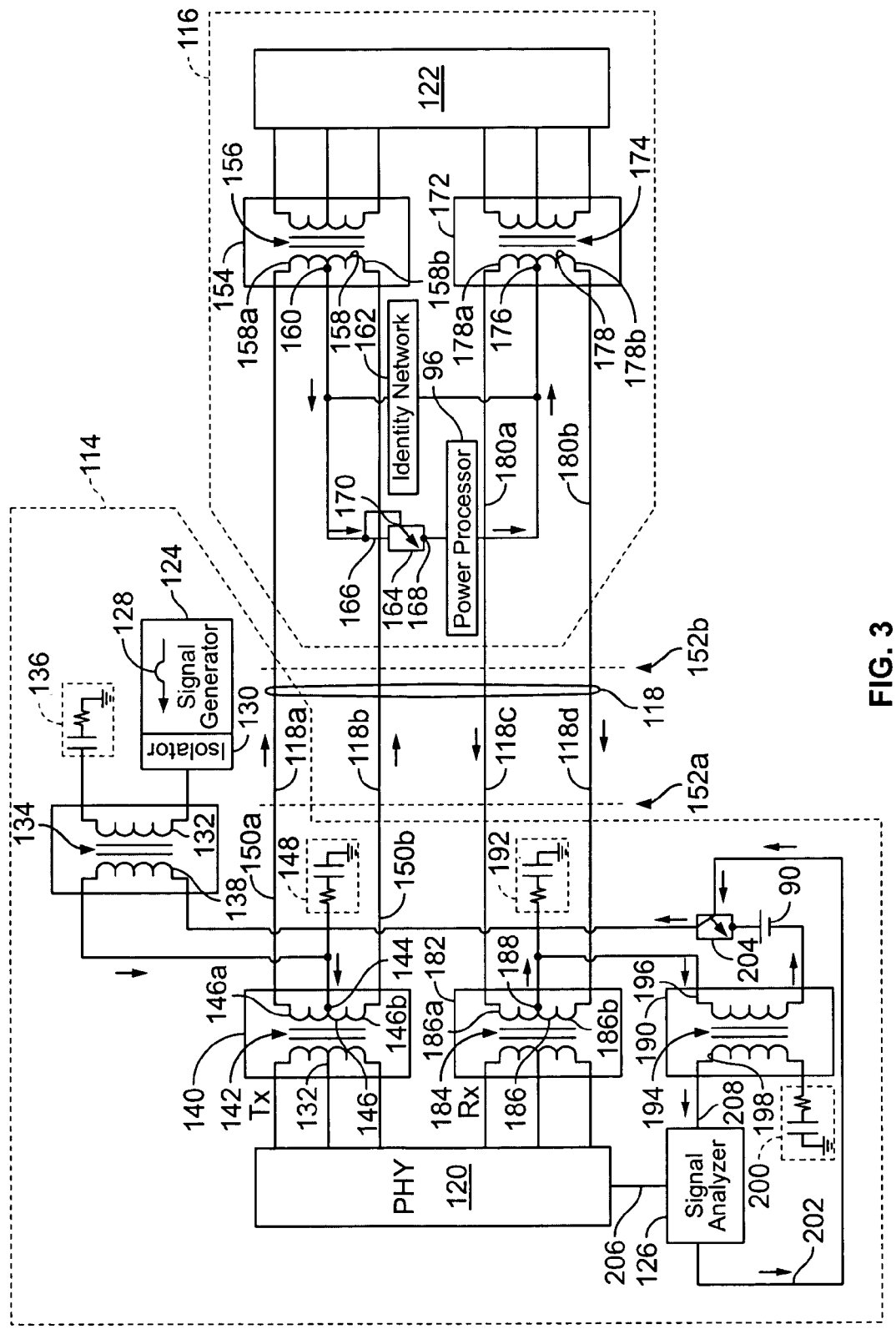
FIG. 3 is an electrical schematic diagram illustrating a phantom powerable DTE detection system in accordance with an embodiment of the present invention.

FIG. 3 illustrates an electric schematic diagram for the DTE-detecting communication device 114 (such as an Ethernet, telephone or VoIP switch) and the phantom powerable DTE device 116 connected by wires or cables 118. The communication device 114 may include a physical layer device (PHY) 120, while the DTE device 116 may include a terminal device 122. A signal generator 124 and a signal analyzer 126 may be used, respectively, to send and receive a common mode detection signal 128 for querying whether a data connection is to be established and/or power is to be applied. The detection signal 128 may be represented by a sinusoidal pulse and is input to an isolator 130 (for surge protection) and then into a primary winding 132 of a first transformer 134 terminating at termination network 136. Then detection signal 128 is preferably a portion of a sinusoidal waveform as illustrated but those of ordinary skill in the art will now realize that other signals may also be propagated.

The detection signal 128 is carried across the first transformer 134 through a secondary winding 138 to a source transmitter 140 having a second transformer 142. The detection signal 128 is input to a center tap 144 of transformer 142 and passes simultaneously through portions 146a and 146b of secondary winding 146 of transformers 142. The center tap 144 may also be connected to a termination network 148 (including resistor, capacitor, and/or ground) for providing a common mode termination. The detection signal 128 then passes out from source transmitter 140 across conductors 150a and 150b to a connector block 152a of communication device 114 over wires 118a and 118b of cable 118 to a connector block 152b of a DTE receiver 154 of DTE device 116 having a third transformer 156.

The detection signal 128 passes simultaneously through portions 158a and 158b of primary winding 158 of third transformer 156 to center tap 160 of transformer 156, and then in parallel through (1) an identity network 162 and (2) a control network that includes a power switch 164 and a power processor 96 for processing phantom power to power DTE device 116. In accordance with one embodiment of the present invention, power switch 164 is a three terminal device having a signal input 166, a signal output 168, and a control input 170. In accordance with this embodiment, DC phantom power is provided over lines 118a, 118b to center tap 160 once a phantom powerable device is detected. Accordingly, by coupling control input 170 to signal input 166 power switch 164 will latch closed while phantom power is available. Those of ordinary skill in the art will now realize that a plethora of other ways exist to achieve the same result. Thus, the power switch 164 is preferably defaulted to open in the absence of power to allow the detection signal 128 to pass through the identity network 162. Identity network 162 is preferably designed to interact with detection signal 128 in such a way that signal analyzer 126 can readily distinguish when identity network 162 is present, that is, in a compatible phantom powerable device and when it is absent, that is, in a legacy device. Identity network 162 should also preferably be designed so as not to interfere with the operation of power processor 96 when switch 164 is closed. Thus identity network 162 can either be adopted to switch out of the circuit contemporaneously with the application of phantom power or identity network 162 can include a circuit which need not be switched out such as a capacitor C1 (FIG. 4A) or a relatively high valued resistor R1 (FIG. 4B) or the like.

Identity network 162 (FIG. 4C) could even include, as will now be apparent to those of ordinary skill in the art, a capacitor C2 to power a memory and a nonvolatile serial memory device M1, so as to read out a series of pulses specifically identifying the type and requirements of the DTE 116. The capacitor C2 could be charged, for example, by a series of detection signal pulses and a rectifier D1 and when sufficient voltage is achieved in C2, a send signal will initiate a memory readout from memory M1. As shown in FIG. 4D, the identity network 162 may alternatively include an inductor L1 to induce a temporal shift to the detection signal which could then be detected by signal analyzer 126 (which would them be supplied with a signal indicating the departure time of detection signal 128 so that it could measure the round trip time looking for a "correct" round trip time in order to provide phantom power). FIG. 4E illustrates a diode used as the identity network. The diode rectifies a sine wave input which would easily be detected at the signal analyzer 126. FIG. 4F illustrates a Zener diode as the identity network. The Zener diode limits the voltage passing through it in addition to rectifying an input signal. This is also easily detected at signal analyzer 126 and well within the capabilities of those of ordinary skill in the art. Identity network 162 is therefore designed to allow the passage of the detection signal 128 (or a variant thereof) to the DTE transmitter 172 causing the signal to be returned and recognized by signal analyzer 126. If the DTE device 116 is a conventional network device not requiring phantom power, the identity network 162 will likely not be present, the detection signal will probably not loop back, or if it does, it will lack the characteristics that the signal analyzer 126 is looking for that are to be imparted by the identity network, and phantom power will therefore not be applied to the part corresponding to DTE device 116.

The (possibly modified) detection signal 128 enters DTE transmitter 172 having a fourth transformer 174. The detection signal 128 enters transformer 174 through center tap 176 and passes through secondary winding portions 178a and 178b of secondary winding 178 back towards the communications device 114 over conductors 180a and 180b across the connector blocks 152b, cable 118 and connector block 152a and into the source receiver 182. A fifth transformer 184 may include secondary winding portions 186a, 186b of secondary winding 186 through which the detection signal 128 passes, before exiting through source receiver center tap 188 and into a postconditioner 190. The center tap 188 may be connected to a termination network 192. A sixth transformer 194 in the postconditioner 190 passes the detection signal 128 through a primary winding 196 (rather than through a center tap) transferring the detection signal 128 to a secondary winding 198 and into signal analyzer 126, and a termination network 200 providing isolation and protection for the active circuitry of the receiver. The analyzer 126 may serve to check received response signal characteristics due to the application of the detection signal 128 to the identity network 162 and determine if phantom power should be applied.

If the signal analyzer 126 determines that phantom power should be applied, a control signal on line 202 is generated to command switch 204 to close thereby providing power from power supply 90 through switch 204 to center taps 144 and 168 in a manner similar to that discussed in U.S. Pat. No. 6,115,468 discussed in detail above.

The power switch 164 may remain open if, despite a received return of detection signal 128, a data signal is also communicated from the DTE device 116. Such a condition indicates that the DTE device 116 already has access to an independent power source and does not require phantom power. An indication of this condition may be passed, for example, from PHY 120 over line 206 to signal analyzer 126 so that signal analyzer 126 withholds a signal on line 202 where data is detected from PHY 120 even if the signal 128 received at signal analyzer 126 over line 208 would otherwise indicate that phantom power should be applied.

Figure 5:
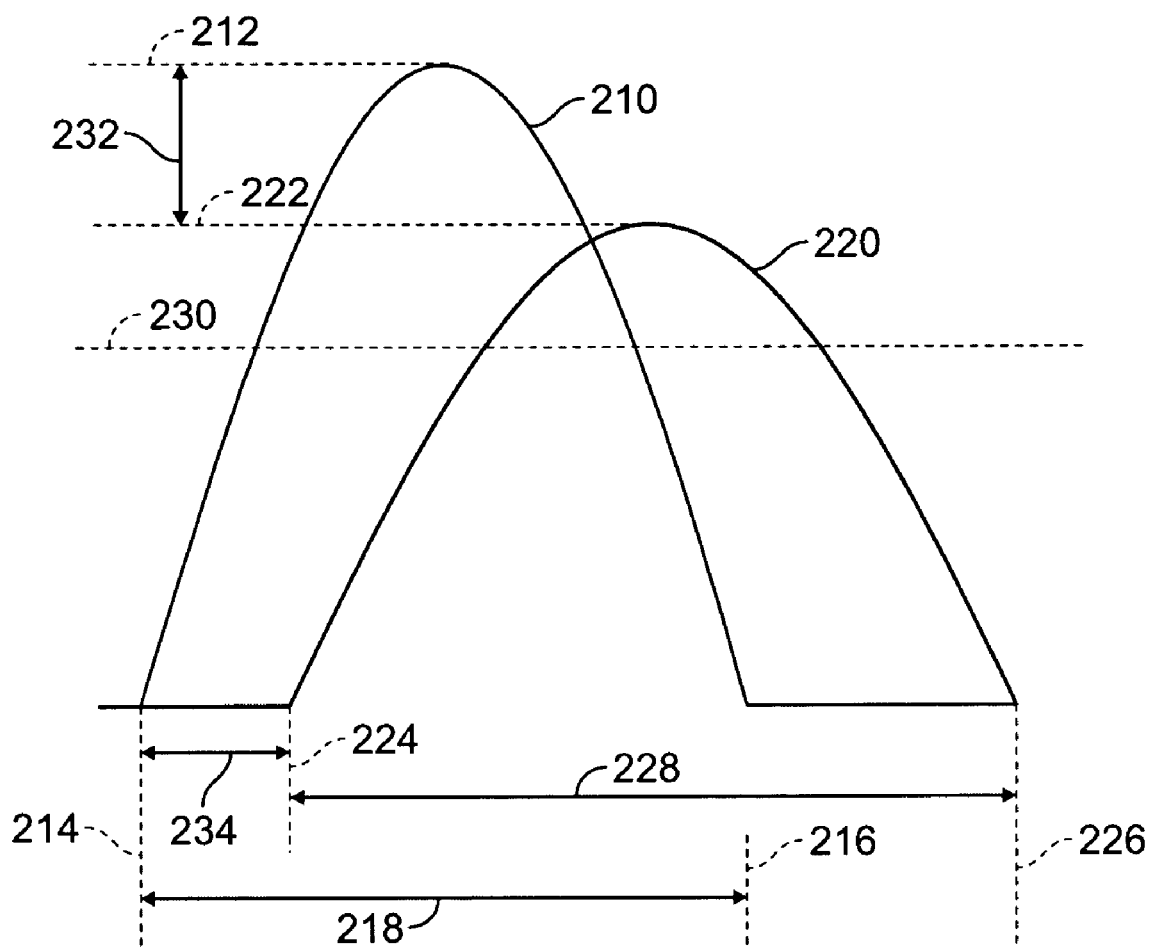
FIGS. 5 and 6 are amplitude versus time graphs illustrating detection signals and response signals in accordance with embodiments of the present invention.

Transmitted and received sinusoidal pulses are shown in FIG. 5 to represent an example form for a detection signal 128. A transmitted pulse 210 for a half-wavelength duration can be described by peak amplitude 212, start time 214, end time 216, and pulse duration 218 there between. A received pulse 220 can be described by peak amplitude 222, start time 224, end time 226, and pulse duration 228 there between. The received pulse 220 may be detectable provided its peak amplitude 222 reaches a detection threshold 230. In accordance with a specific embodiment of the invention, the pulse form exhibits a single frequency sinusoidal pattern, although other waveform shapes are possible as those of ordinary skill in the art will now recognize.

Due to resistance in the conductors the received pulse may be attenuated so that received amplitude 222 is attenuated from the transmitted amplitude 212 by a difference 232. Due to line impedance, the received pulse may be delayed so that the received start time 224 may lag the transmitted start time 214 by a delay 234. In addition, the received pulse may spread so that its duration 228 may be longer than the transmitted duration 218 by the difference between durations 228 and 218. The magnitude of the amplitude difference may be used to enable the analyzer 126 to distinguish a DTE device requiring phantom power from a DTE device not requiring phantom power. In particular, a return signal with an amplitude in the noise level, that is, below threshold 230, may indicate a device with no need for phantom power. A return signal with a relatively unattenuated amplitude may indicate a DTE device with a need for phantom power.

Figure 4A:
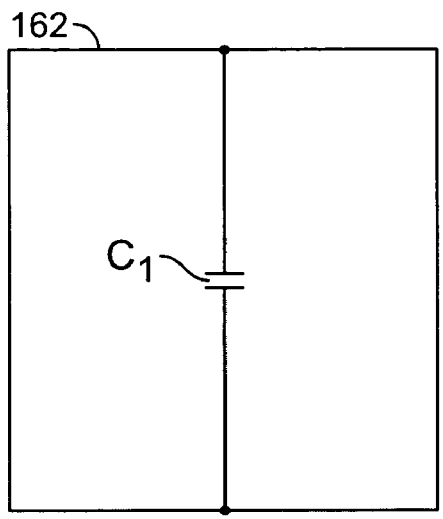
FIGS. 4A, 4B, 4C, 4D, 4E and 4F are electrical schematic diagrams of several variants of an identity network in accordance with embodiments of the present invention.
Figure 4D:
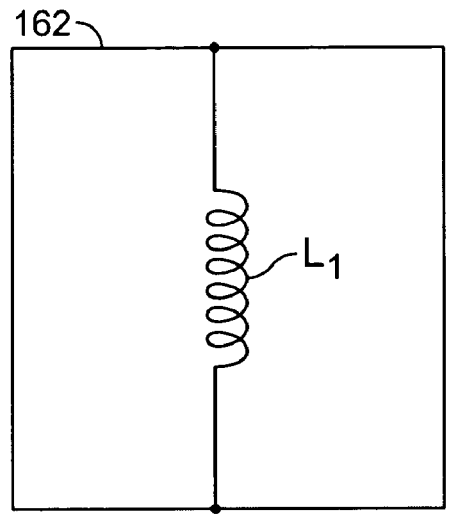
Figure 4B:
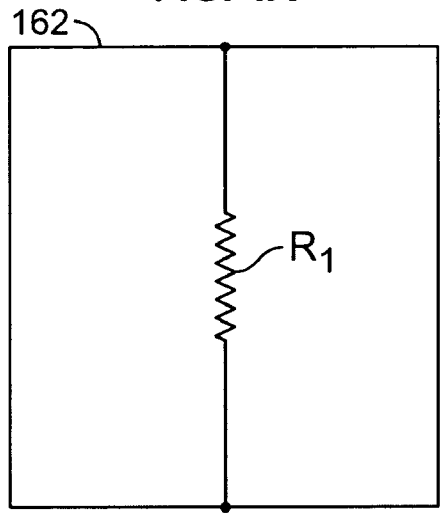
Figure 4E:
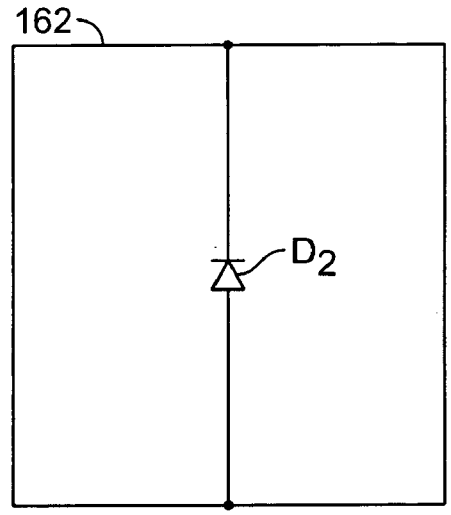
Figure 4C:
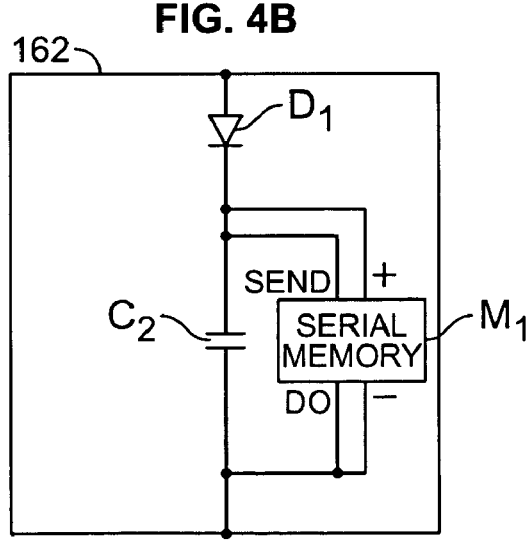
Figure 4F:
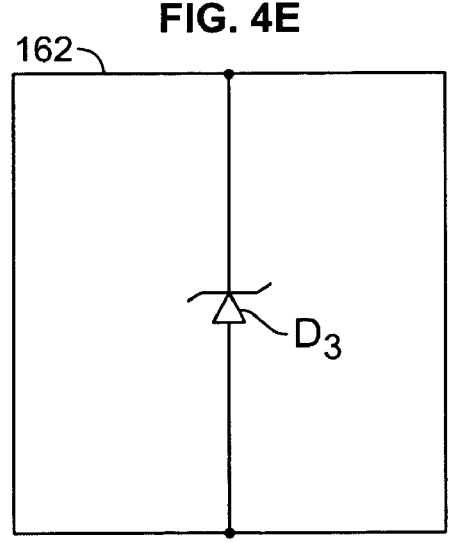
Figure 6:
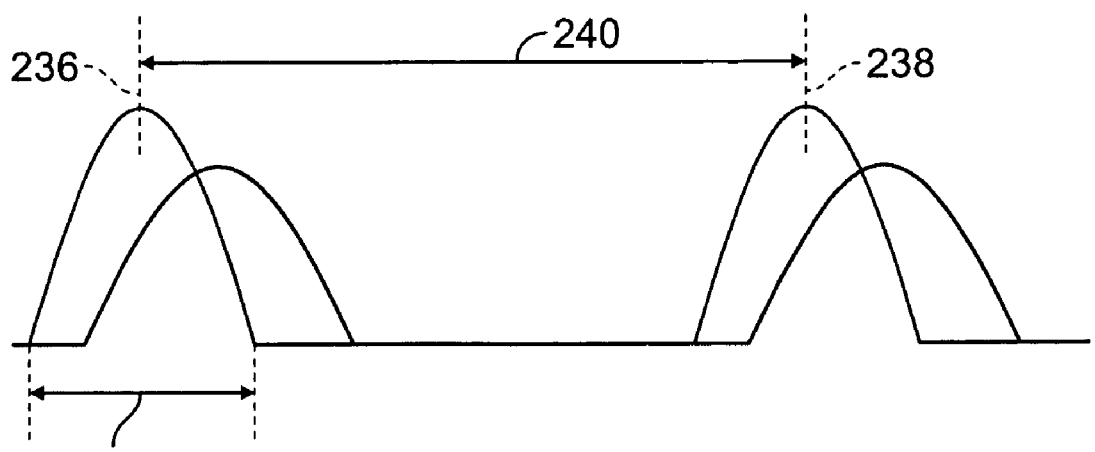

In accordance with a specific embodiment of the present invention, for example, the use of an identity network 162 as shown in FIG. 4A, in order to avoid saturating the DTE identity network 162, the time between pulses 210 should preferably be sufficient to enable charge dissipation of the identity network 162 where it contains capacitive or inductive element. FIG. 6 shows two transmission pulses having peaks 236 and 238 with a period 240 there between. The period 240 may be much longer than the pulse duration 218. The transmission pulse duration 218 may last in the nanosecond or microsecond range, while the period 230 may endure into several milliseconds.

A communications device in accordance with the present invention may encounter three scenarios: (1) no response signal, (2) a proper response signal coupled with active data transmission, and (3) a proper response signal coupled with no active data transmission indicating a need for phantom power.

Figure 7:
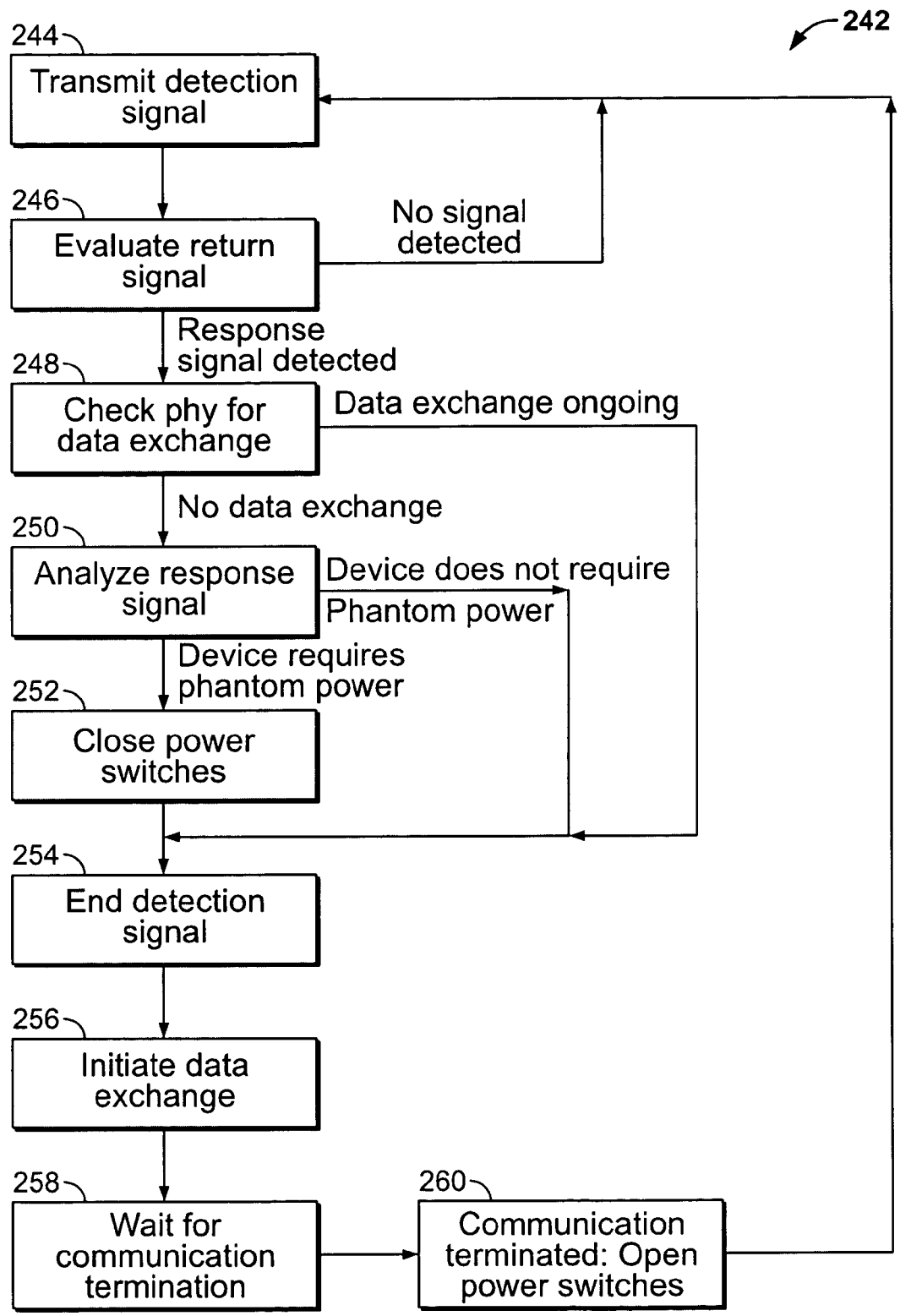
FIG. 7 is a process flow diagram illustrating a method of compatible DTE device detection and phantom power provision in accordance with an embodiment of the present invention.

FIG. 7 is a flow chart 242 illustrating a method used to determine whether or not to apply phantom power to an Ethernet circuit in accordance with an embodiment of the present invention. The communications device 114 transmits a detection signal 128 at block 244 and evaluates the response with signal analyzer 126 at block 246. If no signal is detected, control returns to block 244 and the communications device 114 continues to look for a device requiring phantom power. If a signal is detected, control optionally passes to block 248 where it is determined whether a data signal has been received from the PHY 120. If a data signal has been received then there is no need to take further action because this result means that the DTE device is operating and obviously has a power source. Control may transfer to block 254 as discussed below.

If, on the other hand, no data signal is detected at block 248, then control transfers to block 250 where the signal analyzer analyzes the response signal for a characteristic indicating that it is a DTE device (such as a compatible IP telephone) which requires phantom power. If the analysis at block 250 concludes that a compatible DTE device requiring phantom power is attached, then control transfers to block 252 so that switches 204 and 164 are closed to provide phantom power to the DTE device. While these switches are closed, there is no need to continue transmission of detection signal 128 and this is terminated at block 254. Data exchange is initiated at block 256. Control then transfers to block 258 where the system waits for termination of communication (for example, DTE device is unplugged). If this occurs, control transfers to block 260 and the power switches 204 and 164 are opened before transfer back to block 244. If the analysis at block 250 concludes that an incompatible device or a device not requiring phantom power is attached, control skips block 252 and goes to block 254.

Figure 8:
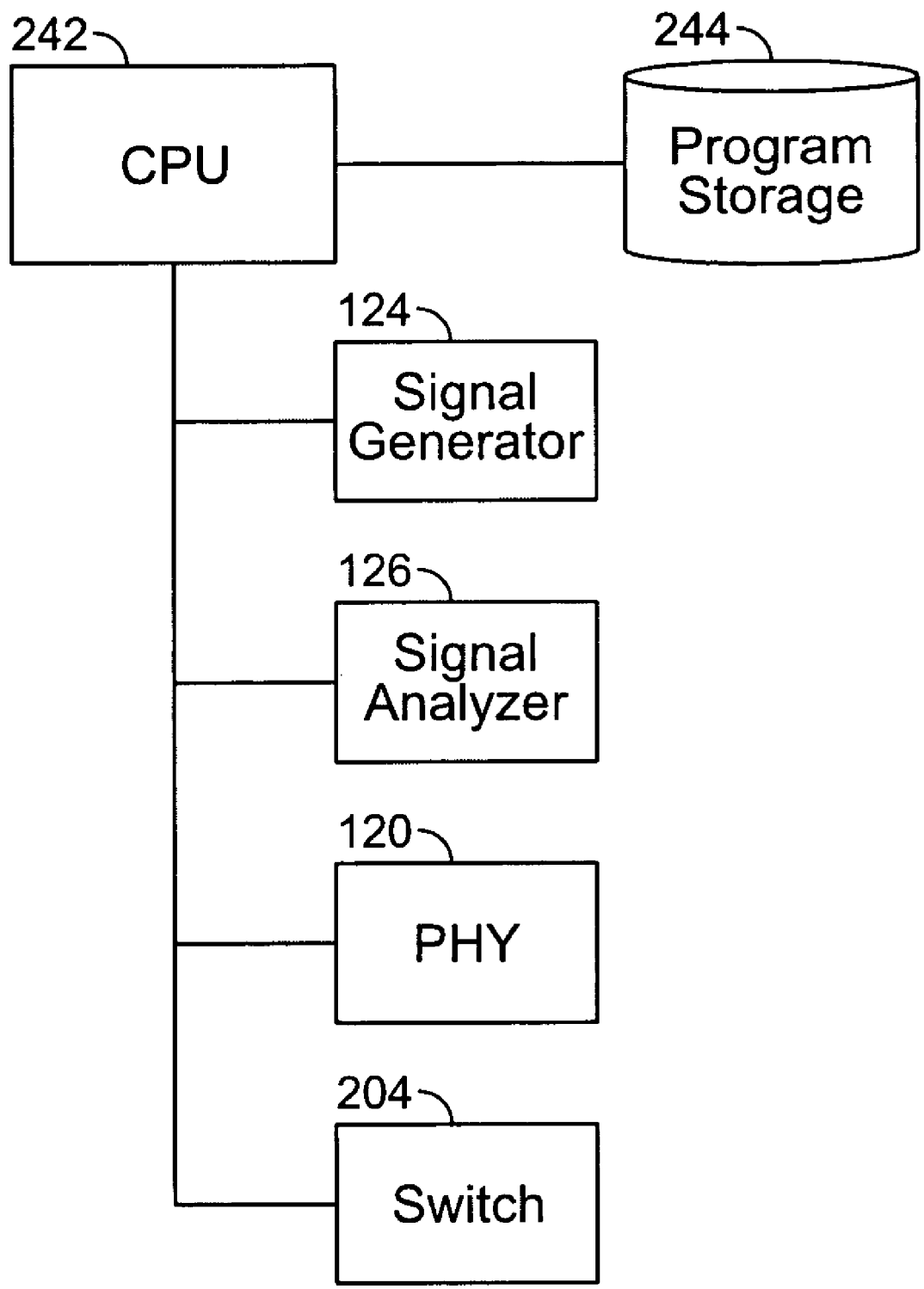
FIG. 8 is a system block diagram of a portion of a compatible DTE device detection and phantom power provision system in accordance with an embodiment of the present invention.

Turning now to FIG. 8, another embodiment of the present invention is shown in block diagram form. In accordance with the embodiment of FIG. 8, central processing unit (CPU) 242 implementing a program of instructions in computer readable memory storage device 244 controls the operation of signal generator 124, signal analyzer 126, and switch 204 while optionally receiving information from PHY 120 (the presence of data exchange with DTE device 116) and controlling switch 204 with it as link 206 does in the embodiment described above. The precise configuration of such a computer-controlled system is well within the skill of those of ordinary skill in the art and therefore need not be described in more detail herein.

The operation of signal analyzer 126 depends entirely on the nature of the identity network 162 chosen. In a very simple embodiment, identity network 162 may be a capacitor. In this case, the pulse will pass through identity network somewhat changed but identity network 162 will not interfere with the phantom power processor at DTE device 116. Since the response signal comes back, the signal analyzer can conclude that the DTE device 116 is compatible. More sophisticated approaches can be used, such as to more specifically identify the DTE device 116 and apply a particular voltage signal selected from among, a plurality of voltage signals available, and the like. Different resistances, inductances or serial memory contents could, for example, be used to provide such more detailed information.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A communication device comprising:
   a port having a plurality of electrical conductors for communicating with a data terminal equipment (DTE) device;
   a signal generator for providing a detection signal over a first pair of the plurality of electrical conductors using common mode signaling;
   a signal analyzer for receiving a response signal responsive to the detection signal from the DTE device over a second pair of the plurality of electrical conductors using common mode signaling;
   a source of electrical power for providing a phantom power signal to the DTE device;
   a switch responsive to the signal analyzer for connecting the source of electrical power to one of the first and second pairs of the plurality of electrical conductors; and
   a physical layer device coupled to receive data signals from a selected one of the first and second pair of the plurality of electrical conductors, and wherein the signal analyzer is responsive to a signal from the physical layer device indicating that data signals are being received by the physical layer device over the selected one of the pairs of the plurality of electrical conductors to prevent the connection of electrical power to the one of the first and second pairs of the plurality of electrical conductors.

2. The communication device in accordance with claim 1, wherein the port includes a type RJ-45 connector.

3. The communication device in accordance with claim 1, wherein the detection signal is a portion of a sine wave signal comprising less than 360 degrees of the sine wave signal.

4. The communication device in accordance with claim 1, wherein the source of electrical power comprises a direct current (DC) power supply.

5. The communication device in accordance with claim 4, wherein the DC power supply provides a potential of no more than about 48 volts.

6. The communication device in accordance with claim 1, wherein the first pair of electrical conductors are coupled to a first transformer having a first center tap.

7. The communication device in accordance with claim 6, wherein the second pair of electrical conductors are coupled to a second transformer having a second center tap.

8. The communication device in accordance with claim 7, wherein the source of power includes two leads, one of which is connected to the first center tap and the other of which is connected to the second center tap.

9. The device of claim 1, wherein the detection signal includes pulses.

10. A communication device comprising:
- a port having a plurality of electrical conductors for communicating with a data terminal equipment (DTE) device;
- a signal generator for providing a detection signal over a first pair of the plurality of electrical conductors using common mode signaling;
- a signal analyzer for receiving a response signal responsive to the detection signal from the DTE device over a second pair of the plurality of electrical conductors using common mode signaling;
- a source of electrical power for providing a phantom power signal to the DTE device; and
- a switch responsive to the signal analyzer for connecting the source of electrical power to one of the first and second pairs of the plurality of electrical conductors,
- wherein the first pair of electrical conductors are coupled to a first transformer having a first center tap, the second pair of electrical conductors are coupled to a second transformer having a second center tap, and the source of power includes two leads, one of which is connected to the first center tap and the other of which is connected to the second center tap, and
- wherein the first and second center tap are each coupled to a termination network.

11. The communication device in accordance with claim 10, wherein the signal generator is coupled to one of the first and second center taps through a transformer.

12. A method for detecting the presence of a compatible data terminal equipment (DTE) device coupled to a port of a communications device, the method comprising:
- transmitting a common mode detection signal over a first pair of conductors of the port;
- repeating the transmitting until a response signal is received over a second pair of conductors of the port;
- receiving a response signal over a second pair of conductors of the port;
- analyzing the response signal to determine whether the response signal indicates that a phantom power signal should be provided to the port; and
- closing a switch to provide the phantom power signal to the port if the response signal indicates that the phantom power signal should be provided to the port, unless data signals are received over a selected one of the first and second pair of conductors to a physical layer device to indicate that the port has access to an independent power source.

13. The method in accordance with claim 12, further comprising:
terminating transmission of the detection signal.

14. The method in accordance with claim 13, further comprising:
commencing data communication over the port.

15. The method in accordance with claim 14, further comprising:
waiting for termination of data communication over the port.

16. The method in accordance with claim 15, further comprising:
opening the switch in response to the termination of data communication over the port.

17. The method of claim 12, wherein the detection signal includes pulses.

18. An apparatus for detecting the presence of a compatible data terminal equipment (DTE) device coupled to a port of a communications device, the apparatus comprising:
- means for transmitting a common mode detection signal over a first pair of conductors of the port;
- means for repeating the transmitting until a response signal is received over a second pair of conductors of the port;
- means for analyzing the response signal to determine whether the response signal indicates that a phantom power signal should be provided to the port;
- means for receiving data signals over a selected one of the first and second pair of conductors to a physical layer device, the data signals indicating that the port has access to an independent power source; and
- means for closing a switch to the provide phantom power signal to the port if the response signal indicates that the phantom power signal should be provided to the port, unless the data signals are received.

19. The apparatus in accordance with claim 18, further comprising:
means for terminating transmission of the detection signal.

20. The apparatus in accordance with claim 19, further comprising:
means for commencing data communication over the port.

21. The apparatus in accordance with claim 20, further comprising:
means for waiting for termination of data communication over the port.

22. The apparatus in accordance with claim 21, further comprising:
means for opening the switch in response to the termination of the communication over the port.

23. The apparatus of claim 18, wherein the detection signal includes pulses.

24. A program storage device readable by a machine, tangibly embodying a program of instructions executable by the machine for detecting the presence of a compatible data terminal equipment (DTE) device coupled to a port of a communications device, the method including:
- transmitting a common mode detection signal over a first pair of conductors of the port;
- repeating the transmitting until a response signal is received over a second pair of conductors of the port;
- receiving a response signal over a second pair of conductors of the port;
- analyzing the response signal to determine whether the response signal indicates that a phantom power signal should be provided to the port; and closing a switch to provide the phantom power signal to the port if the response signal indicates that the phantom power signal should be provided to the port, unless data signals are received over a selected one of the first and second pair of conductors to a physical layer device to indicate that the port has access to an independent power source.

25. The device in accordance with claim 24, wherein the method further comprises:

terminating transmission of the detection signal.

26. The device in accordance with claim 25, wherein the method further comprises:

commencing data communication over the port.

27. The device in accordance with claim 26, wherein the method further comprises:

waiting for termination of data communication over the port.

28. The device in accordance with claim 27, wherein the method further comprises:

opening the switch in response to the termination of data communication over the port.

29. The program storage device of claim 24, wherein the detection signal includes pulses.

* * * * *